(12) United States Patent
Okuno

(10) Patent No.: US 7,103,285 B1
(45) Date of Patent: Sep. 5, 2006

(54) OPTICAL TRANSMISSION SYSTEM FOR REDUCING NONLINEAR OPTICAL PHENOMENA USING MODULATION DEPTH CONTROL SYSTEM

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 501 days.

(21) Appl. No.: 09/696,030

(22) Filed: Oct. 26, 2000

Related U.S. Application Data

(63) Continuation-in-part of application No. PCT/JP99/01014, filed on Feb. 23, 2000.

(30) Foreign Application Priority Data

Apr. 13, 1999 (JP) ............... P11-105449

(51) Int. Cl.
H04B 10/04 (2006.01)

(52) U.S. Cl. .......... 398/192; 398/193; 398/185; 398/186; 398/187

(58) Field of Classification Search ........... 398/182, 398/185–187, 192, 193, 198, 141, 158
See application file for complete search history.

(56) References Cited

U.S. PATENT DOCUMENTS

| | | | | |
|---|---|---|---|---|
| 5,477,368 A * | 12/1995 | Eskildsen et al. | ........... | 398/147 |
| 5,550,667 A * | 8/1996 | Krimmel et al. | ........... | 398/194 |
| 5,576,876 A * | 11/1996 | Takeyari et al. | ........... | 398/147 |
| 5,812,297 A * | 9/1998 | Mussino et al. | ........... | 398/198 |
| 5,973,812 A * | 10/1999 | Imai et al. | ........... | 398/192 |
| 6,078,414 A * | 6/2000 | Iwano | ........... | 398/182 |
| 6,078,417 A * | 6/2000 | Perino et al. | ........... | 398/157 |
| 6,252,692 B1 * | 6/2001 | Roberts | ........... | 398/147 |

FOREIGN PATENT DOCUMENTS

| | | |
|---|---|---|
| EP | 0 720 313 | 7/1996 |
| EP | 0 724 171 | 7/1996 |
| JP | 9-23187 | 1/1997 |
| JP | 9-139715 | 5/1997 |

(Continued)

OTHER PUBLICATIONS

"A 5 Gb/s Repeaterless Transmission System Using Erbium-Doped Fiber Amplifiers" by Park et al., Kannan and Frisken: Bidirectional Transmission System, pp. 79-82.

"Efficient Phase Modulation Scheme for Suppressing Stimulated Brillouin Scattering" by Korotky et al., IOOC '95, WD2-1 (1995), pp. 110-111.

(Continued)

*Primary Examiner*—Leslie Pascal
*Assistant Examiner*—Dalzid Singh
(74) *Attorney, Agent, or Firm*—McDermott Will & Emery LLP

(57) ABSTRACT

An optical transmitter enables output of high-power light signals while effectively suppressing occurrence of the nonlinear optical phenomena, particularly, SBS, and an optical communication system provided therewith. The optical transmitter comprises a modulation signal source for outputting modulation signals of the frequency not more than 20 kHz, a semiconductor laser source for outputting laser light amplitude-modulated according to the modulation signals from the modulation signal source, an optical amplifier for amplifying the laser light from the semiconductor laser source, and a modulation depth control system for controlling a ratio of an amplitude modulation depth of amplified laser light outputted from the optical amplifier to an amplitude modulation depth of the laser light outputted from the semiconductor laser source. The modulation depth control system controls the amplitude modulation depth of the amplified laser light outputted from the optical amplifier at least in the range of 60% or less of the amplitude modulation depth of the laser light inputted into the optical amplifier.

5 Claims, 10 Drawing Sheets

FOREIGN PATENT DOCUMENTS

| | | |
|---|---|---|
| JP | 9-205399 | 8/1997 |
| JP | 9-232662 | 9/1997 |

OTHER PUBLICATIONS

"Degradations Due to Stimulated Brillouin Scattering in Multigigabit Intensity-Modulated Fiber-Optic Systems" by Fishman et al., Journal of Lightwave Technology, vol. 11, No. 11 (Nov. 1993), pp. 1721-1728.

"Transmission Limitations of CPFSK Coherent Lightwave Systems Due to Stimulated Brillouin Scattering in Optical Fiber" by Sugie, Journal of Lightwave Technology, vol. 9, No. 9 (Sep. 1991), pp. 1145-1155.

"Stimulated Brillouin Scattering Suppression with Low Residual AM Using a Novel Temperature Wavelength-Dithered DFB Laser Diode" by Eskildsen et al., Electronics Letters, vol. 32, No. 15 (Jul. 18, 1996), pp. 1387-1388.

Fishman et al., "Degradations Due to Stimulated Brillouin Scattering in Multigigabit Intensity-Modulated Fiber-Optic Systems", Journal of Lightwave Technology, 11 (1993) Nov. , No. 11, New York, US, pp. 1721-1728, XP000416668.

European Search Report, Date: Mar. 23, 2006.

* cited by examiner

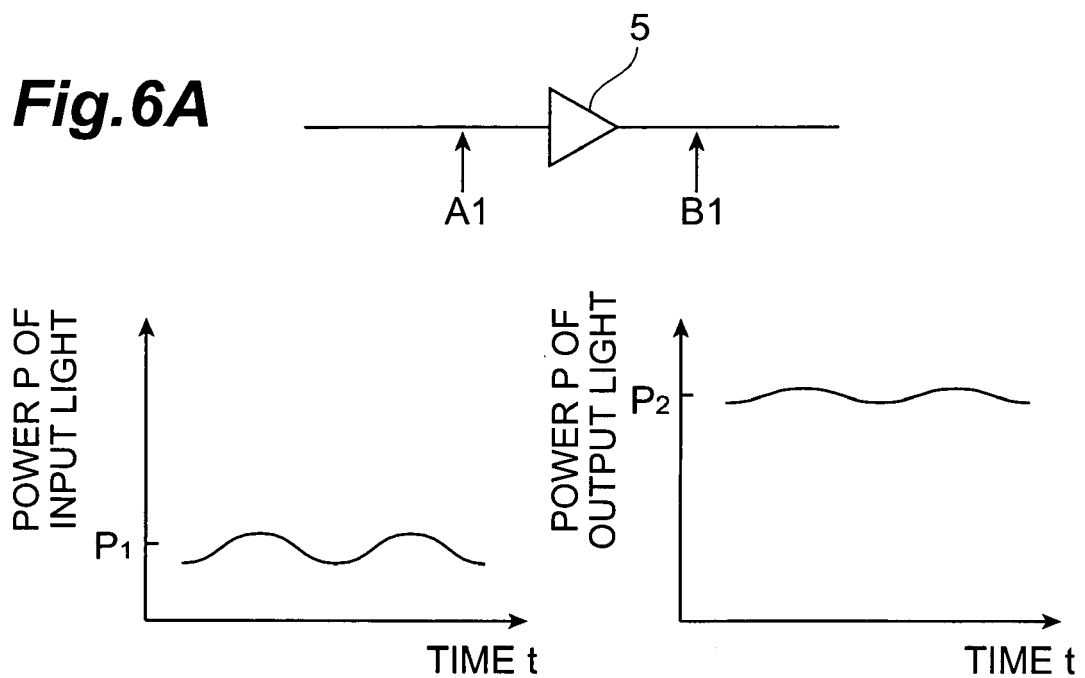
Fig.6A
Fig.6B
Fig.6C
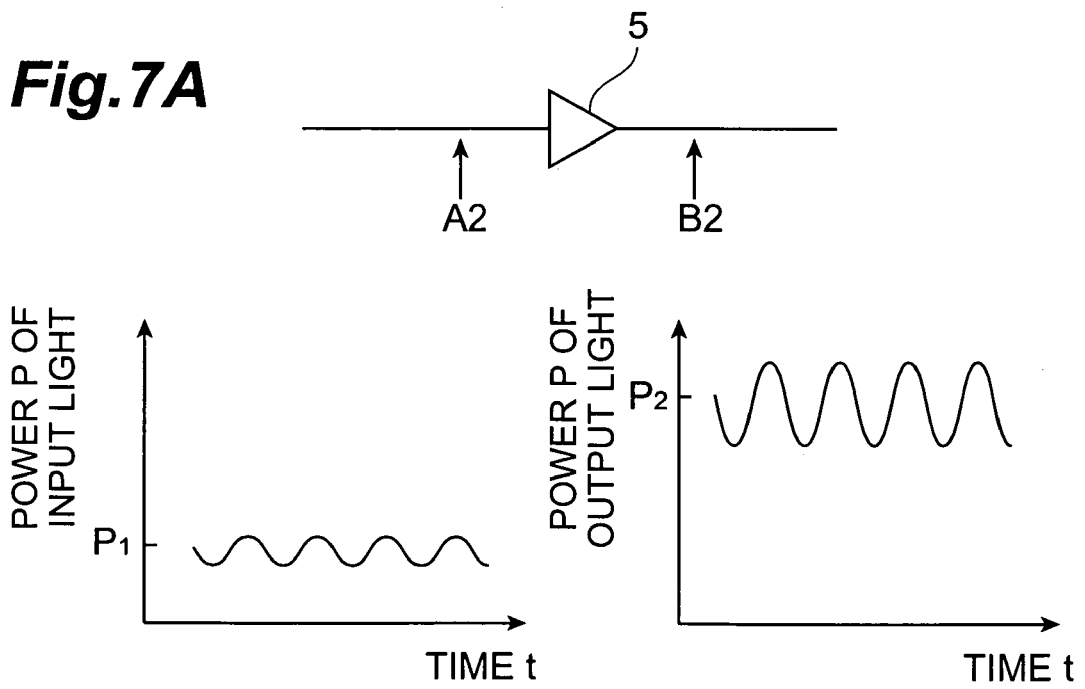
Fig.7A
Fig.7B
Fig.7C

OPTICAL TRANSMISSION SYSTEM FOR REDUCING NONLINEAR OPTICAL PHENOMENA USING MODULATION DEPTH CONTROL SYSTEM

RELATED APPLICATIONS

This is a Continuation-In-Part application of International patent application serial No. PCT/JP99/01014 filed on Feb. 23, 2000, now pending.

BACKGROUND OF THE INVENTION

1. Field of the Invention

The present invention relates to an optical transmitter for outputting light signals to an optical transmission line and an optical communication system provided therewith.

2. Related Background Art

The common optical communication systems are provided with an optical transmitter for outputting light signals, an optical transmission line, such as an optical fiber or the like, for transmitting the light signals, and an optical receiver for receiving the light signals having propagated through this optical transmission line. It is generally known as to the optical transmission lines such as the optical fibers that the nonlinear optical, phenomena become easier to occur in the optical transmission line when the power of light signals propagating therethrough is high. It is also known that the nonlinear optical phenomena degrade the signal waveform, so as to tend to cause reception errors at the optical receiver. For this reason, it is an important subject in the field of the optical communication systems to restrain occurrence of the nonlinear optical phenomena and thereby prevent the degradation of the signal waveform.

There are a variety of nonlinear optical phenomena known as those occurring in the optical fibers, one of which is the stimulated Brillouin scattering (which will be referred hereinafter as SBS). For example, Reference 1: Y. K. Park et al., "A 5 Gb/s Repeaterless Transmission System Using Erbium-Doped Fiber Amplifiers," IEEE Photon. Technol. Lett., Vol. 5, No. 1, pp. 79–82 (1993) describes the result of experiments to investigate the relationship between occurrence of SBS and degradation of transmission characteristics.

As techniques for restraining the occurrence of SBS there are, for example, the techniques described in Reference 2: S. K. Korotky et al., "Efficient Phase Modulation Scheme for Suppressing Stimulated Brillouin Scattering," IOOC '95, WD2-1 (1995), Reference 3: D. A. Fishman et al., "Degradations Due to Stimulated Brillouin Scattering in Multigigabit Intensity-Modulated Fiber-Optic System," J. Lightwave Technol., Vol. 11, No. 11, pp. 1721–1728 (1993), Reference 4: T. Sugie, "Transmission Limitations of CPFSK Coherent Lightwave Systems Due to Stimulated Brillouin Scattering in Optical Fiber," J. Lightwave Technol., Vol. 9, No. 9, pp. 1145–1155 (1991), and Reference 5: L. Eskildsen et al., "Stimulated Brillouin scattering suppression with low residual AM using a novel temperature wavelength-dithered DFB laser diode," Electron. Lett., Vol. 32, No. 15, pp. 1387–1388 (1996), and so on.

The SBS suppression techniques described in these References 2 to 5 are fundamentally the technology for suppressing the occurrence of SBS by phase modulation or frequency modulation of laser light emitted from a semiconductor laser as a light source. The phase-modulated or frequency-modulated laser light is outputted as light including signals to the optical transmission line after high-frequency signal components are superimposed thereon. The SBS suppression technique described in above Reference 5 is the technology of adequately reducing amplitude modulation of the laser light emitted from the semiconductor laser source by minimizing amplitude modulation caused during the phase modulation. In the semiconductor laser source, the phase modulation or frequency modulation of the laser light is effected by varying the refractive index of an active layer according to bias or driving current modulated by a modulation signal source, and thus it also brings about unintended amplitude modulation at the same time. Therefore, Reference 5 discloses the semiconductor laser source provided with special structure for suppressing the amplitude modulation caused during the phase modulation.

SUMMARY OF THE INVENTION

The inventor investigated the above-stated prior arts and found the following issue. Namely, as illustrated in FIG. 1, the period of the amplitude modulation over the light including signals is equal to the period 1/fm of the phase modulation or frequency modulation. In this FIG. 1, the average power of the laser light emitted from the semiconductor laser source is indicated by $P_1$ and the power amplitude of the laser light by $a_1$. The modulation depth is defined as $a_1/P_1$.

If the laser light emitted with the driving current supplied to the semiconductor laser source does not undergo direct modulation, the spectrum of the laser light emitted from the semiconductor laser source will be one having the shape of a narrow bandwidth around the frequency $f_0$, as illustrated in FIG. 2A. If the laser light emitted with the driving current supplied to the semiconductor laser source undergoes direct modulation on the other hand, the spectrum of the laser light emitted from the semiconductor laser source will be one having the shape of a broad bandwidth around the frequency $f_0$, as illustrated in FIG. 2B, because of occurrence of chirping due to variation in the refractive index of the waveguide layer in the semiconductor laser source. Then this expansion of the spectral width of laser light makes it possible to suppress the occurrence of SBS.

In the conventional optical communication systems, since the power of the laser light from the semiconductor laser source is low, it is common practice to amplify the laser light once by an optical amplifier and thereafter output the amplified light to the optical transmission line. The light including signals having passed through the optical amplifier (the amplified laser light), as illustrated in FIG. 3, has the average optical power $P_2$ larger than the average optical power $P_1$ of the laser light emitted from the semiconductor laser source, the power amplitude of $a_2$ ($>a_1$), and the modulation depth of $a_2/P_2$. It is noted here that the modulation components from the signal source is omitted from this waveform illustrated in FIG. 3.

Therefore, the light including signals outputted from the optical amplifier to the optical transmission line can be regarded as amplitude-modulated light having the average optical power of $P_2$ and the amplitude of $a_2$, and the maximum optical power $P_{max}$ thereof is given by $P_2+a_2$. If this maximum optical power $P_{max}$ exceeds a predetermined threshold (FIG. 4A shows a state in which the sum of the maximum optical power $P_{max}$ and the signal light intensity E is over the predetermined threshold L1 in the region indicated by A and FIGS. 4A and 4B also include an illustration of the signal components, unlike FIG. 3), the nonlinear optical phenomena, such as four-wavemixing, Self-Phase Modulation (SPM), etc., will become prominent in the optical transmission line and, as illustrated in FIG. 4B, the signal light after propagation through the long-haul optical transmission line will demonstrate considerable degradation of the waveform due to influence of dispersion in the optical transmission line. This will result in alternate appearance of regions with heavy waveform degradation (regions as indicated by A in FIG. 4A and FIG. 4B) and regions with little waveform degradation in the period of 1/fm on the time axis in the conventional optical communication.

The present invention has been accomplished in order to solve the above-stated issue and an object of the present invention is thus to provide an optical transmitter having the structure for enabling output of high-power light signals while effectively suppressing occurrence of the nonlinear optical phenomena, particularly, SBS, and an optical communication system equipped therewith.

An optical transmitter according to the present invention is characterized by comprising a modulation signal source for outputting modulation signals of a predetermined frequency, a semiconductor laser source driven by the modulation signals from the modulation signal source to output laser light modulated according to the modulation signals, an optical amplifier for amplifying the laser light from the semiconductor laser source, and a modulation depth control system for controlling a ratio of an amplitude modulation depth of amplified laser light outputted from the optical amplifier, to an amplitude modulation depth of the laser light inputted into the optical amplifier in the range of 60% or less. And, it is preferably a modulation depth of light outputted from the optical amplifier is 10% or less.

In the above-stated structure the modulation signal source for supplying the electric signals for driving the above semiconductor laser source is utilized as a signal source for supplying signals to be superimposed on the laser light, but the optical transmitter may also be constructed in structure further comprising a signal source for outputting signals to be transmitted, in the form of an electric signal, and an external modulator which is disposed on a transmission line between the semiconductor laser source and the optical amplifier, which amplitude-modulates the laser light outputted from the semiconductor laser source, based on the electric signals outputted from the signal source, and which outputs the amplitude-modulated laser light as light including signals to the optical amplifier. The above optical amplifier may comprise an erbium-doped optical fiber. In this case, since the response characteristic of population inversion is relatively low in the amplifying optical fiber, the modulation frequency in the modulation signal source is more preferably in the range of 20 kHz or less.

In this way, the laser light outputted from the semiconductor laser source is amplitude-modulated by the modulation signals of the predetermined frequency (preferably, 20 kHz or less), the high-frequency signal components are superimposed thereon to form the light including signals (in the case of the structure having the external modulator, the signal components are superimposed on the laser light by the external modulator in accordance with the electric signals from the signal source), and these light signals is amplified by the optical amplifier. In the optical transmitter according to the present invention, since the modulation depth control system controls the amplitude modulation depth of the amplified laser light outputted from the optical amplifier in the range of 60% or less to the amplitude modulation depth of the laser light inputted into the optical amplifier, a modulation depth of the outputted light from the optical amplifier is 10% or less, the sum of the maximum optical power $P_{max}$ of the laser light outputted from the optical amplifier and the signal light intensity E can be kept at or below the level L1 where the waveform degradation becomes unignorable due to the nonlinear optical phenomena (see FIG. 4A) and it can effectively suppress the occurrence of SBS in the optical transmission line placed after the optical transmitter while enabling output of high-power light signals.

In the optical transmitter according to the present invention, the aforementioned modulation depth control system controls either one of a driving system of the semiconductor laser source and a time response element of the optical amplifier, thereby controlling the amplitude modulation depth of the amplified laser light outputted from the optical amplifier in the range of 60% or less to the amplitude modulation depth of the laser light inputted into the optical amplifier, and the modulation depth of the outputted light from the optical amplifier in the range of 10% or less. Specifically, the control operation over the driving system of the semiconductor laser source can be implemented by a control operation to control the modulation frequency to the semiconductor laser source and the signal intensities of the driving signals, and the control operation over the time response element of the optical amplifier by a control operation to control a parameter τ (response speed of population inversion) of the amplifying optical fiber in the optical amplifier (i.e., by selection of the amplifying optical fiber applied to the optical amplifier), or by a control operation to control a time constant of a circuit element in the optical amplifier.

An optical communication system according to the present invention comprises the above-stated optical transmitter for outputting light signals, an optical transmission line through which the light signals outputted from the optical transmitter propagates, and an optical receiver for receiving the light signals having propagated through the optical transmission line. In this optical communication system, the light signals outputted from the optical transmitter travels through the optical transmission line to the optical receiver to be received thereby. Since the above-stated optical transmitter is applied to this system, it can suppress the occurrence of SBS in the optical transmission line and transmit the light signals of high power, thus decreasing the reception errors at the optical receiver.

Each of the embodiments of the present invention can be fully understood by the detailed description and accompanying drawings which follow. These embodiments should be considered to be simply illustrative but not restrictive for the invention.

The scope of further application of the present invention will become apparent by the detailed description of the invention which follows. However, the detailed description and specific examples are given for describing the preferred embodiments of the present invention, and are presented only for illustration, and it is obvious that various modifications and improvements within the spirit and scope of the present invention are apparent to those who are skilled in the art from the detailed description.

BRIEF DESCRIPTION OF THE DRAWINGS

FIG. 6A to FIG. 6C are diagrams to show the waveforms of the light including signals at the input end and at the output end of the optical amplifier where the modulation frequency is low, wherein FIG. 6A shows the optical amplifier, FIG. 6B the waveform of the light including signals at the part indicated by A1 (i.e., at the input end) in FIG. 6A showing the optical amplifier, and FIG. 6C the waveform of the light including signals at the part indicated by B1 (i.e., at the output end) in FIG. 6A showing the optical amplifier.

FIG. 7A to FIG. 7C are diagrams to show the waveforms of the light including signals at the input end and at the output end of the optical amplifier where the modulation frequency is high, wherein FIG. 7A shows the optical amplifier, FIG. 7B the waveform of the light including signals at the part indicated by A2 (i.e., at the input end) in FIG. 7A showing the optical amplifier, and FIG. 7C the waveform of the light including signals at the part indicated by B2 (i.e., at the output end) in FIG. 7A showing the optical amplifier.

FIG. 8A and FIG. 8B are diagrams to show spectra of the laser light where the modulation frequency is 1 kHz and the modulation depth is 20%, wherein FIG. 8A is a diagram to show the laser light spectrum before input into the optical amplifier and FIG. 8B a diagram to show the laser light spectrum after passage through the optical amplifier.

FIG. 9A and FIG. 9B are diagrams to show spectra of the laser light where the modulation frequencies are 7 kHz and 20 kHz and the modulation depth is 20%, wherein FIG. 9A is a diagram to show the laser light spectrum before input into the optical amplifier and FIG. 9B a diagram to show the laser light spectrum after passage through the optical amplifier.

FIG. 10A and FIG. 10B are diagrams to show the time waveforms of the laser light where the modulation frequency is 1 kHz and the modulation depth is 10%, wherein FIG. 10A is a diagram to show the time waveform of the laser light before input into the optical amplifier and FIG. 10B a diagram to show the time waveform of the laser light after passage through the optical amplifier.

FIG. 11A and FIG. 11B are diagrams to show the time waveforms of the laser light where the modulation frequency is 40 kHz and the modulation depth is 10%, wherein FIG. 11A is a diagram to show the time waveform of the laser light before input into the optical amplifier and FIG. 11B a diagram to show the time waveform of the laser light after passage through the optical amplifier.

DETAILED DESCRIPTION OF THE PREFERRED EMBODIMENTS

The optical transmitters and optical communication systems according to the present invention will be described hereinafter with reference to FIG. 5A to FIG. 11B, FIG. 12, and FIG. 13. In the description of the drawings like elements will be denoted by the same reference symbols and redundant description will be avoided.

Figure 1:
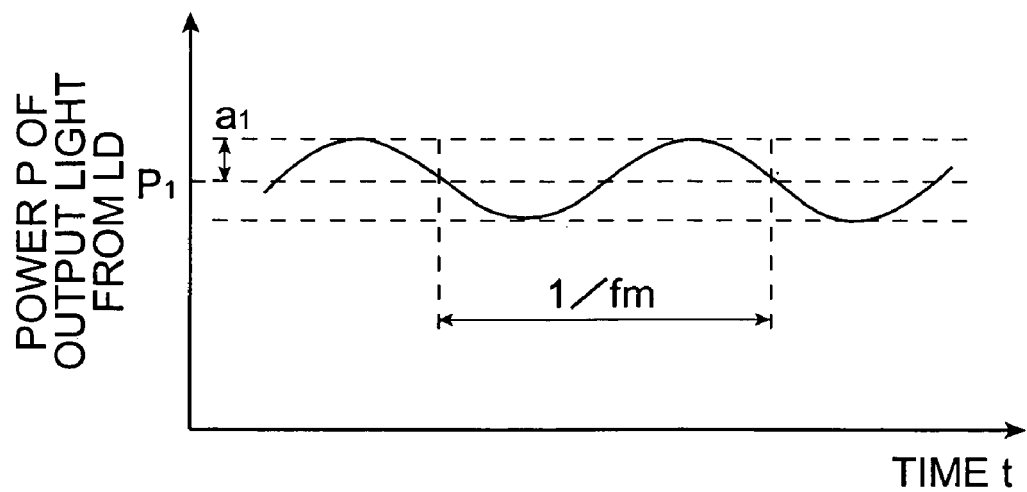
FIG. 1 is a drawing for explaining the waveform of the laser light (light including signals) outputted from the semiconductor laser source.
Figure 2A:
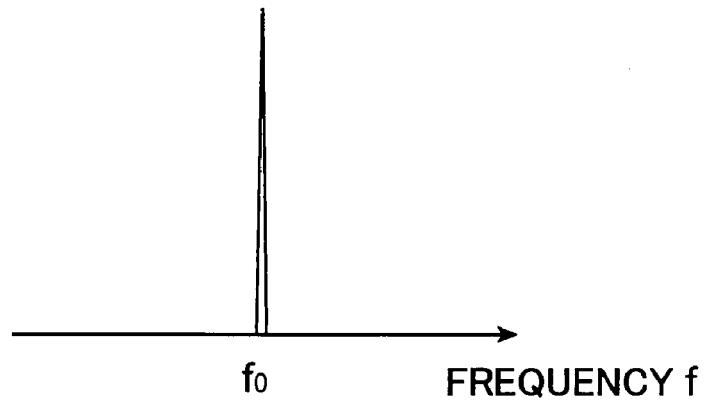
FIG. 2A and FIG. 2B are drawings for explaining the spectra of the laser light outputted from the semiconductor laser source.
Figure 2B:
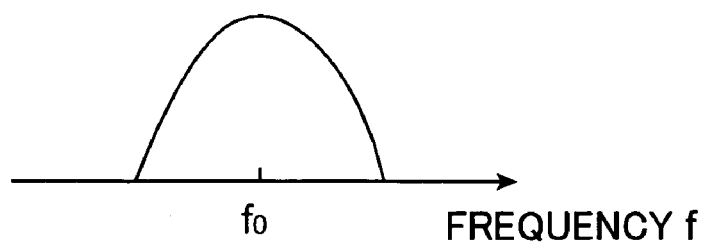
Figure 3:
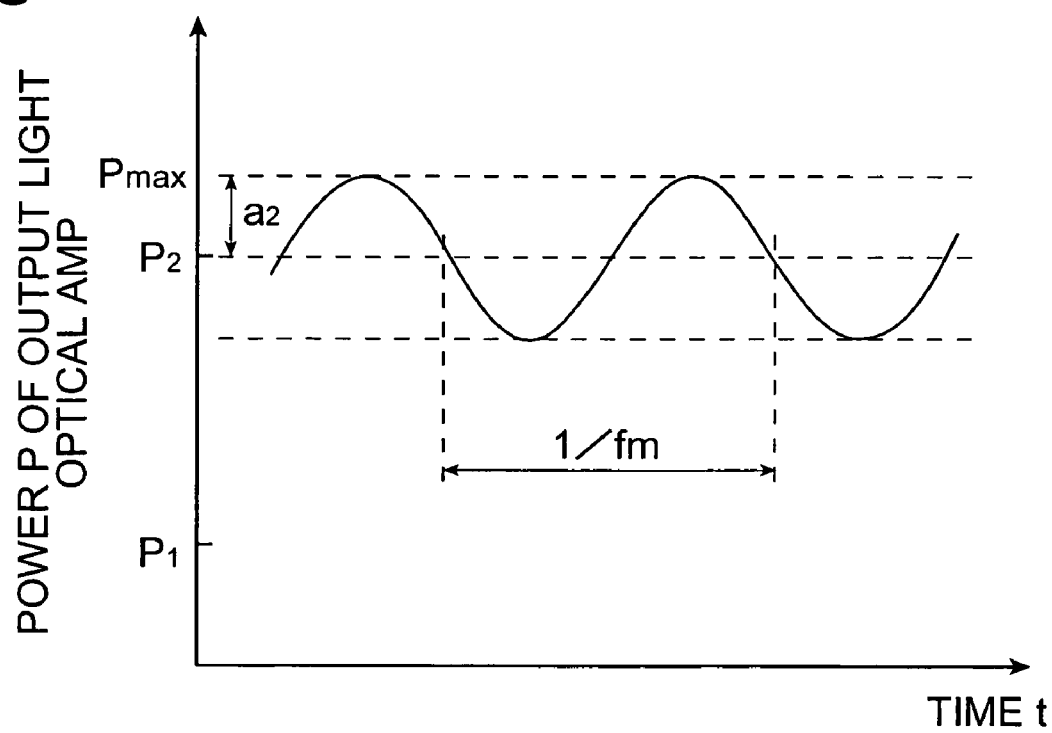
FIG. 3 is a diagram for explaining the waveform of the laser light amplified by the optical amplifier with no data signal.
Figure 4A:
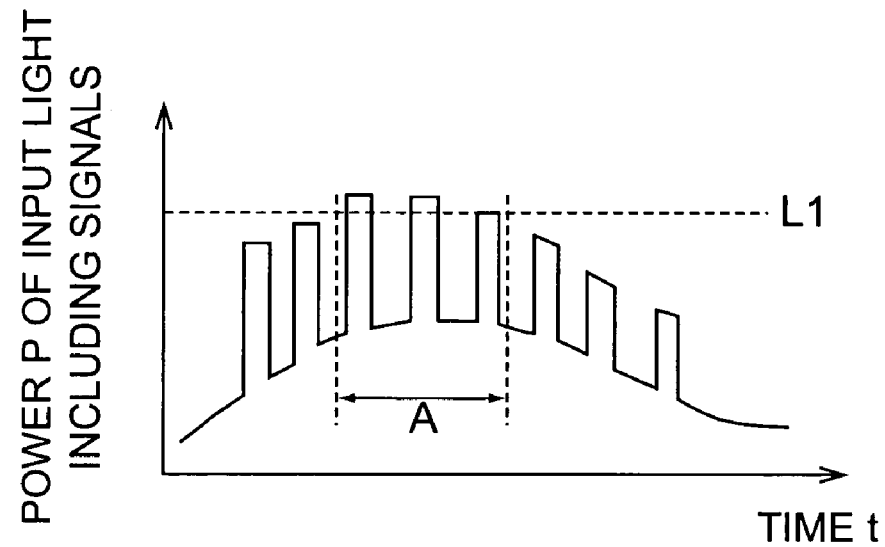
FIG. 4A is a diagram to show the waveform of the light including signals accompanied by the data signals to be outputted from the optical amplifier to the optical transmission line, and FIG. 4B a diagram for explaining the waveform of light including signals after long-haul transmission.
Figure 4B:
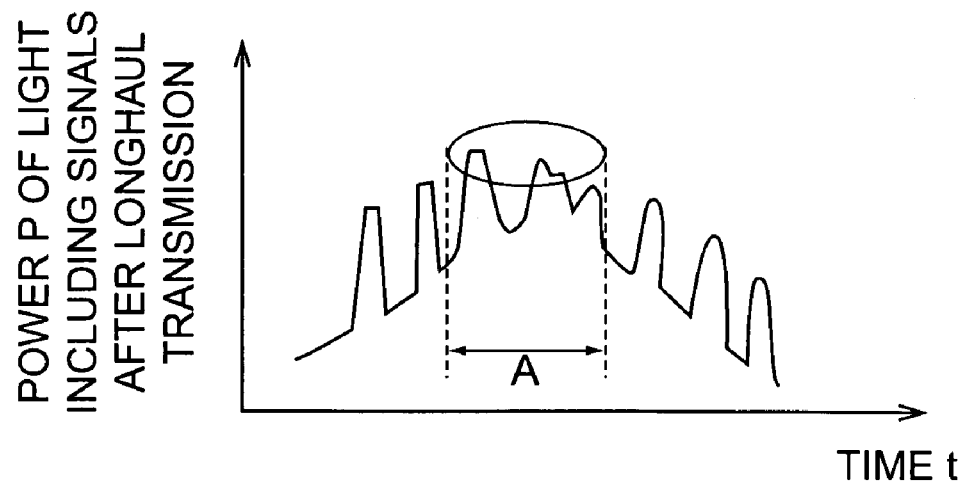
Figure 5A:
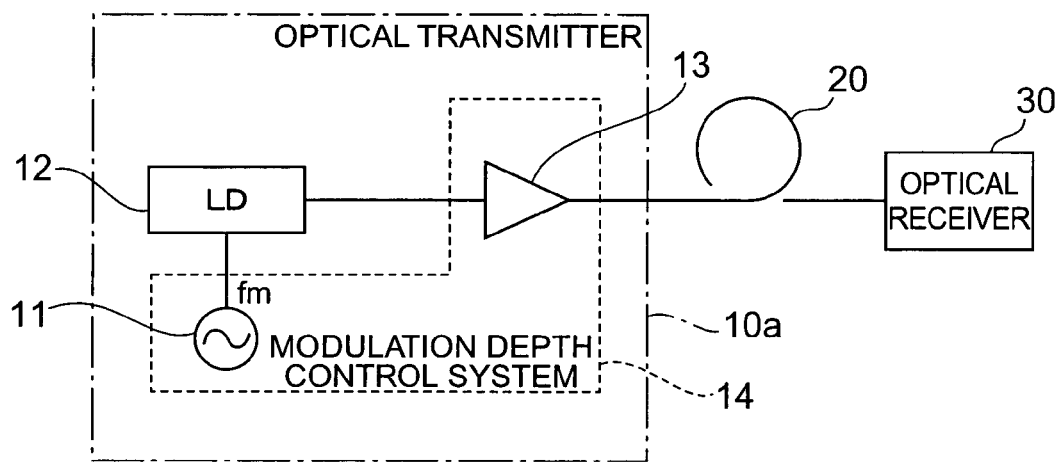
FIG. 5A is a diagram to show the structure of the first embodiment of the optical transmitter and the optical communication system provided therewith according to the present invention, and FIG. 5B a diagram to show the structure of the second embodiment of the optical transmitter and the optical communication system provided therewith according to the present invention.

FIG. 5A is a diagram to show the structure of the first embodiment of the optical transmitter and the optical communication system provided therewith according to the present invention, and the optical communication system according to the first embodiment is provided with an optical fiber transmission line 20, an optical transmitter 10a disposed on the input end side of the optical fiber transmission line 20, and an optical receiver 30 disposed on the output end side of the optical fiber transmission line 20. In this first embodiment, the optical transmitter 10a is constructed to perform the modulation operation over the laser light of a carrier wave and the superposition operation of the signal components simultaneously and, specifically, the optical transmitter 10a comprises a modulation signal source 11 functioning to output the modulation signals of the frequency fm and also functioning as a signal source, a semiconductor laser source 12 (LD) for outputting the laser light (including the signal components) phase-modulated or frequency-modulated and also amplitude-modulated, based on the modulation signals, an optical amplifier 13 for amplifying the laser light outputted from the semiconductor laser source 2, as light including signals, and a modulation depth control system for controlling the amplitude modulation depth of the amplified laser light outputted from the optical amplifier in the range of 60% or less to the amplitude modulation depth of the laser light inputted into the optical amplifier, and the modulation depth of the output light from the optical amplifier in the range of 10% or less.

Figure 5B:
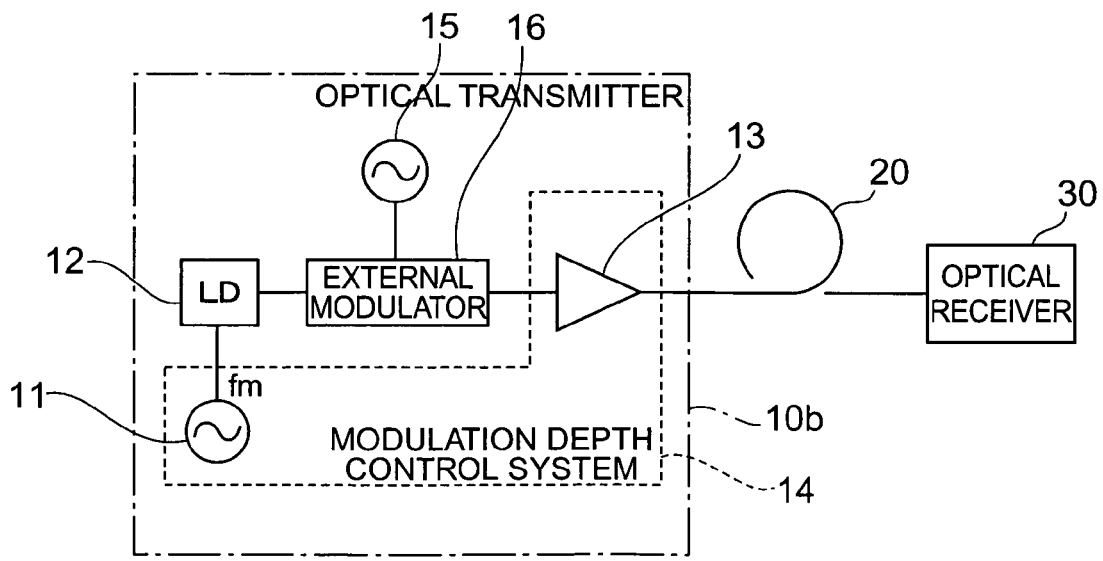

On the other hand, FIG. 5B is a diagram to show the structure of the second embodiment of the optical transmitter and the optical communication system provided therewith according to the present invention, and the optical communication system according to the second embodiment is provided with the optical fiber transmission line 20, the optical transmitter 10b disposed on the input end side of the optical fiber transmission line, and the optical receiver 30 disposed on the output end side of the optical fiber transmission line 20. In this second embodiment, the optical transmitter 10b is constructed of separate mechanisms for outputting the laser light of the carrier wave and for superimposing the high-frequency signals thereon and, specifically, it has the modulation signal source 11, the semiconductor laser source 12 (LD), the optical amplifier 13, and the modulation depth control system 14 and further has a signal source 15 for outputting the signals to be transmitted, in the form of an electric signal, and an external modulator 16 which is disposed on the transmission line between the semiconductor laser source 12 and the optical amplifier 13, which amplitude-modulates the laser light outputted from the semiconductor laser source 12, based on the electric signals outputted from the signal source 15, and which outputs the amplitude-modulated laser light as the light including signals to the optical amplifier 13.

The modulation signal source 11 outputs the modulation signals of the frequency fm, for example, 20 kHz or less to the semiconductor laser source 12. The semiconductor laser source 12 is driven by the modulation signals of the frequency fm outputted from the modulation signal source 11 and outputs the laser light amplitude-modulated while phase-modulated or frequency-modulated according to the modulation signals. The wavelength band of this laser light is preferably the 1.55 μm wavelength band, for example. The signal source 15 outputs the signal components to be transmitted, in the form of the electric signal. The external modulator 16 amplitude-modulates the laser light outputted from the semiconductor laser source 12, based on the electric signal outputted from the signal source 15, and outputs the amplitude-modulated laser light as the light including signals.

The optical amplifier 13 amplifies the signal light outputted from the external modulator 16 and outputs the amplified light including signals to the optical transmission line 20. Particularly, the optical amplifier 13 is preferably an erbium-doped optical fiber amplifier which has an amplifying optical fiber with the core region doped with the element Er or the like, and a pumping source for supplying pumping light of a predetermined wavelength to the amplifying optical fiber. The reason is that it becomes easier to control the modulation depth of the light including signals outputted from the optical amplifier 13, because the response characteristic of population inversion is relatively low in the amplifying optical fiber where the optical amplifier 13 is the erbium-doped optical fiber amplifier.

Here the modulation depth control system 14 controls at least either one of the driving system (modulation signal source 11) of the semiconductor laser source 12 and the time response element of the optical amplifier 13, thereby controlling the amplitude modulation depth of the amplified laser light (frequency fm) outputted from the optical amplifier in the range of 60% or less to the amplitude modulation depth of the laser light inputted into the optical amplifier, and the modulation depth of the outputted light from the optical amplifier in the range of 10% or less.

Then the signal light outputted from the optical amplifier 13 of the optical transmitter 10b propagates through the optical transmission line 20 to reach the optical receiver 30. The optical receiver 30 receives these light signals thus arriving. In the structure as described above, the signal light can be transmitted from the optical transmitter 10 through the optical transmission line 20 to the optical receiver 30 with effectively suppressing the occurrence of SBS and avoiding the degradation of the signal waveform, even in high-speed optical transmission over 1 Gbs.

In the conventional optical communication systems, where the optical power is 7 dBm or more for the light signals outputted from the optical transmitter 10 to the optical transmission line 20, the occurrence of nonlinear optical phenomena becomes conspicuous in the optical transmission line 20. However, in the case of the optical transmitters 10a, 10b having their respective structures according to the embodiments, the occurrence of SBS can be effectively restrained (the waveform degradation of light including signals can be avoided) even if the optical power of the light including signals outputted to the optical transmission line 20 is 7 dBm or more.

Further, in the conventional optical communication systems, even if the value of $<N2>/A_{eff}$ is $6\times10^{-10}$/W or more at the input end of the optical transmission line 20 where $<N2>$ is a nonlinear refractive index of the optical fiber of the optical transmission line 20 and $A_{eff}$ is an effective area, the occurrence of nonlinear optical phenomena becomes conspicuous in the optical transmission line 20. In contrast with it, the optical transmitters 10a, 10b according to the present invention can effectively suppress the occurrence of SBS even if the value of $<N2>/A_{eff}$ is $6\times10^{-10}$/W or more at the input end of the optical transmission line 20.

The refractive index $<N>$ of the medium under strong light varies depending upon the light intensity as described above. Therefore, the lowest-order effect on this index $<N>$ is expressed by the following equation:

$$<N>=<N0>+<N2>\cdot|E|^2$$

where $<N0>$: refractive index for linear polarization;
$<N2>$: second-order nonlinear refractive index for nonlinear polarization; and
$|E|^2$: light intensity.

Namely, under strong light, the refractive index $<N>$ of the medium is given by the sum of the normal value $<N0>$ and an increase proportional to the square of the amplitude E of the electric field of the light. Particularly, the proportional constant $<N2>$ of the second term (unit: $m^2$/W) is called the second-order nonlinear refractive index. Since distortion of signal pulses is affected mainly by the second-order nonlinear refractive index out of the nonlinear refractive indexes, the nonlinear refractive index stated in the present specification mainly means this second-order nonlinear refractive index.

In addition, the aforementioned effective area $A_{eff}$ is given by the following equation, as described in Japanese Patent Application Laid-Open No. 8-248251 (EP0724171A2).

$$A_{eff} = 2\pi \left( \int_0^\infty E^2 r\,dr \right)^2 \Big/ \left( \int_0^\infty E^4 r\,dr \right)$$

In this equation, E represents the electric field caused by the propagating light and r the radial distance from the center of the core.

Now let us describe in detail how the present invention has been accomplished.

With input of the light signals to the optical amplifier 13, the response of the optical amplifier 13 to the modulation waveform (the modulation components of the frequency fm from the modulation signal source 11) of the inputted light including signals is reduced to temporal behavior of population inversion (gain coefficient) in the laser medium of the optical amplifier 13 upon input of light signals. The response speed of population inversion in the laser medium of the optical amplifier 13 is dominated by the effective lifetime $\tau_{eff}$ of the higher energy state of the laser medium expressed by the following equation.

$$\tau_{eff}=\tau/(1+I/I_s+I_p/I_{pth})$$

In this equation, $\tau$ is the lifetime of the higher energy state in the amplifying optical fiber under absence of light, I the intensity of the inputted light including signals, $I_s$ the saturation intensity of the inputted light including signals, $I_p$ the intensity of the pumping light, and $I_{pth}$ the threshold intensity of the pumping light where the laser medium of the optical amplifier 13 becomes transparent.

When the frequency fm of the amplitude modulation (the modulation components from the modulation signal source 11) of the light including signals inputted into the optical amplifier 13 is relatively low, i.e., when the period 1/fm of the amplitude modulation is longer than the effective lifetime $\tau_{eff}$ of the higher energy state, the population inversion (gain coefficient) in the optical amplifier 13 can follow variation in the intensity of the light including signals inputted into the optical amplifier 13. As a consequence, the light including signals outputted from the optical amplifier 13 demonstrates a decrease of the modulation depth; the modulation depth at the input end is decreased to that at the output end, as illustrated in FIG. 6B and FIG. 6C, or the modulation amplitude becomes almost zero (continuous light). FIG. 6B is a diagram to show the waveform of the light including signals at the part (input end) indicated by A1 in FIG. 6A showing the optical amplifier, and FIG. 6C a diagram to show the waveform of the light including signals at the part (output end) indicated by B1 in FIG. 6A.

On the other hand, when the frequency fm of the amplitude modulation (the modulation components from the modulation signal source 11) of the light including signals inputted into the optical amplifier 13 is relatively high, i.e., when the period 1/fm of the amplitude modulation is shorter than the effective lifetime $\tau_{eff}$ of the higher energy state, the population inversion (gain coefficient) in the optical amplifier 13 becomes unable to follow the variation in the intensity of the inputted light including signals, so that the optical amplifier 13 comes to have an almost constant gain coefficient according to the average intensity of the inputted light including signals. As a consequence, as illustrated in FIG. 7B and FIG. 7C, the modulation depth of the light including signals outputted from the optical amplifier 13 becomes almost equal to that of the light including signals inputted into the optical amplifier 13. FIG. 7B is a diagram to show the wave form of the light including signals at the part (input end) indicated by A2 in FIG. 7A showing the optical amplifier, and FIG. 7C a diagram to show the wave form of the light including signals at the part (output end) indicated by B2 in FIG. 7A showing the optical amplifier. It is noted that the modulation components (signal components) from the signal source 11 is omitted from the illustration of the waveform in each of above FIG. 6B, FIG. 6C, FIG. 7B, and FIG. 7C.

As apparent from the above equation concerning the effective lifetime $\tau_{eff}$ of the higher energy state, while the intensity I of the light including signals inputted into the optical amplifier 13 is sufficiently smaller than the saturation intensity $I_s$, the change of the intensity I of the light including signals makes little contribution to the value of the effective lifetime $\tau_{eff}$ of the higher energy state (or is negligible). However, when the intensity I of the inputted light including signals becomes approximately equal to or larger than the saturation intensity $I_s$, i.e., when the optical amplifier 13 is operated near the saturation intensity, the change of the intensity I of the inputted light including signals comes to make great contribution to the value of the effective lifetime $\tau_{eff}$ of the higher energy state. Therefore, the occurrence of SBS in the optical transmission line will pose a problem in the ordinary optical communication systems in which the optical amplifier 13 is operated near the saturation intensity.

Figure 8A:
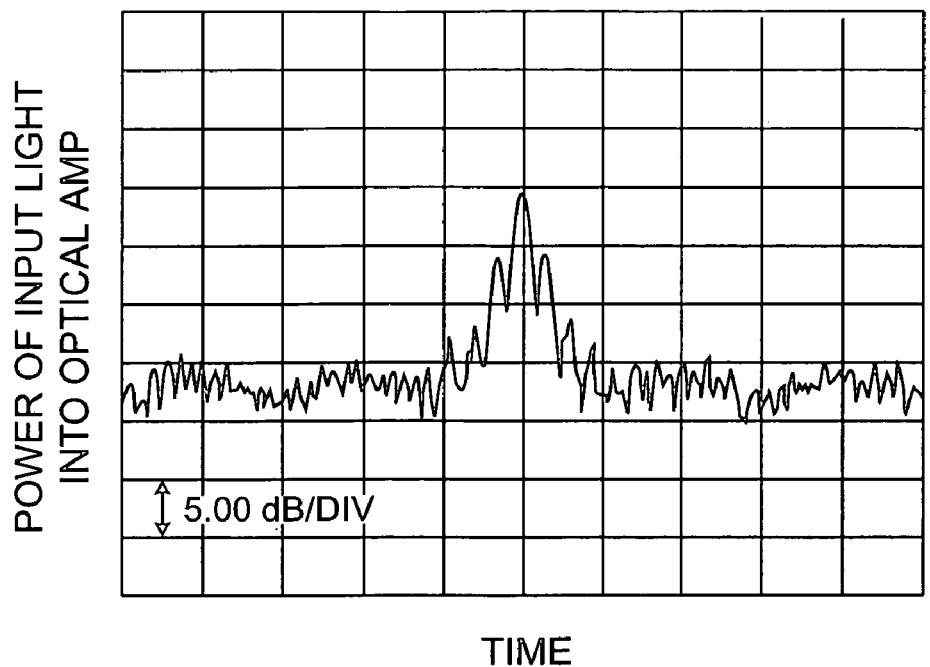
Figure 8B:
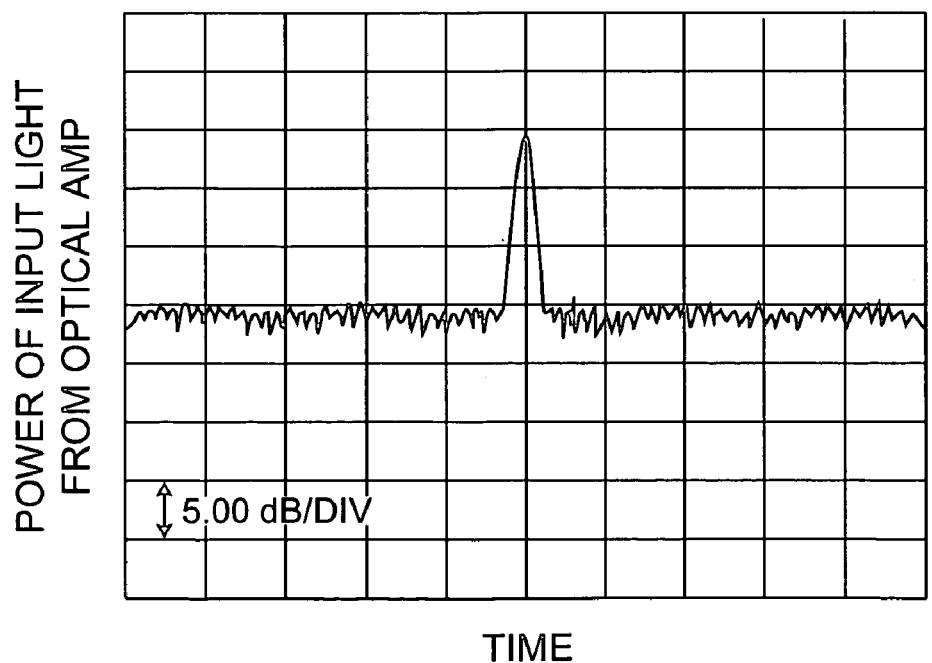

The inventor proved the above-stated phenomena by experiments. FIG. 8A and FIG. 8B are diagrams to show the spectra of the laser light where the modulation frequency fm is 1 kHz and the modulation depth is 20%, wherein FIG. 8A is a diagram to show the laser light spectrum before input into the optical amplifier 13 (the spectrum of the light including signals before amplification) and FIG. 8B a diagram to show the laser light spectrum after passage through the optical amplifier 13 (the spectrum of the light including signals after amplification). As seen from these diagrams, the sideband component corresponding to the modulation frequency fm disappeared from the light including signals outputted from the optical amplifier 13.

Figure 9A:
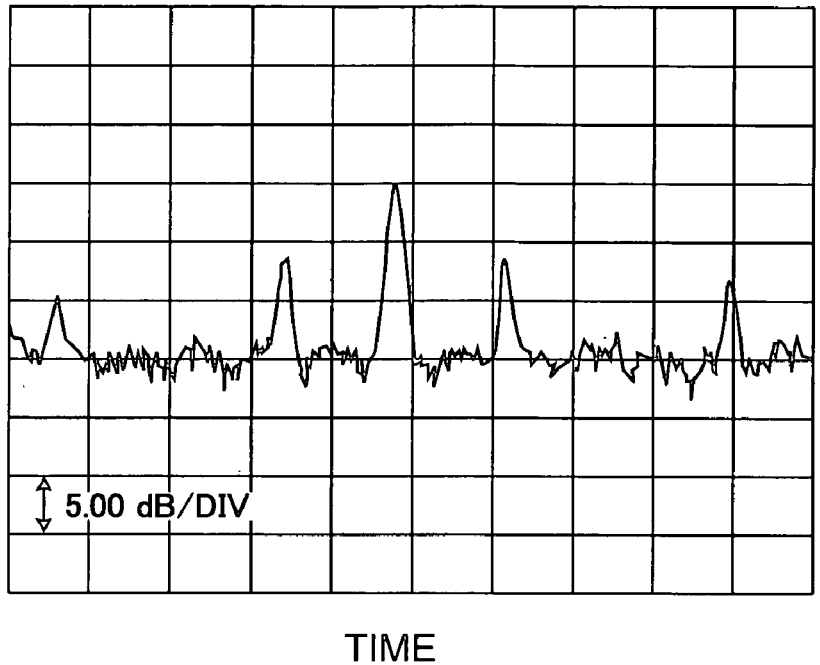
Figure 9B:
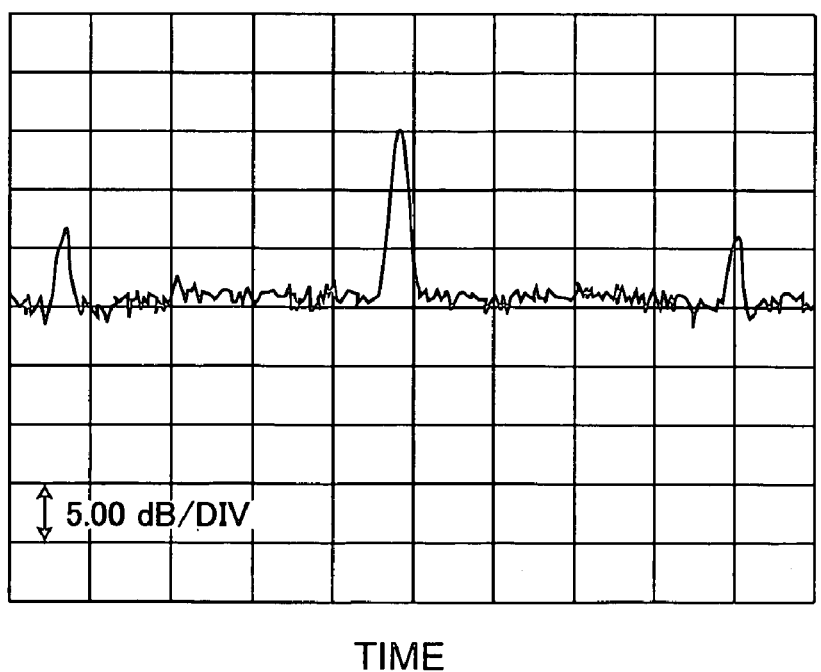

FIG. 9A and FIG. 9B are diagrams to show laser light spectra where the modulation frequencies fm are 7 kHz and 20 kHz and the modulation depth is 20%, wherein FIG. 9A is a diagram to show the laser light spectrum before input into the optical amplifier 13 (the spectrum of the light including signals before amplification) and FIG. 9B a diagram to show the laser light spectrum after passage through the optical amplifier 13 (the spectrum of the light including signals after amplification). As seen from these figures, the component of the modulation frequency of 7 kHz disappeared but the components of the modulation frequency of 20 kHz remained in the light including signals outputted from the optical amplifier 13.

Figure 10A:
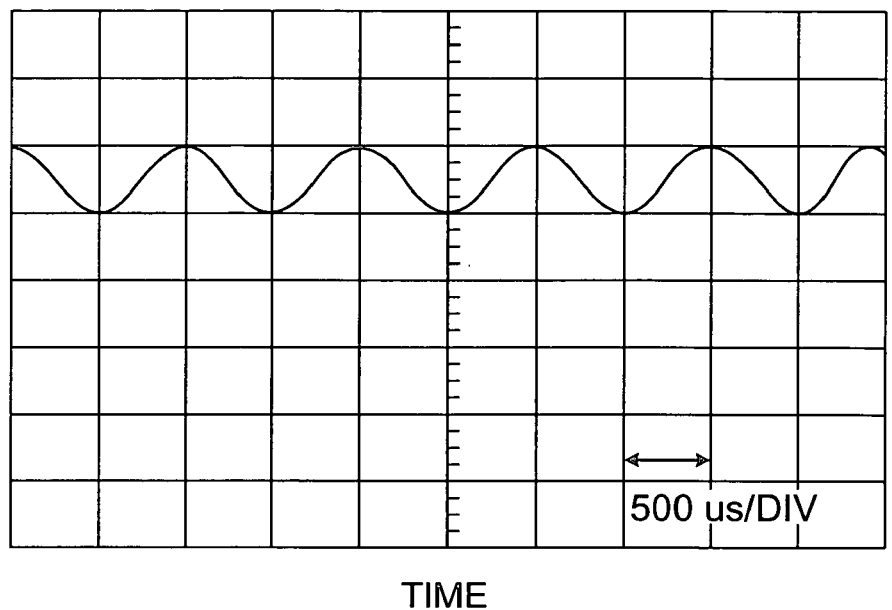
Figure 10B:
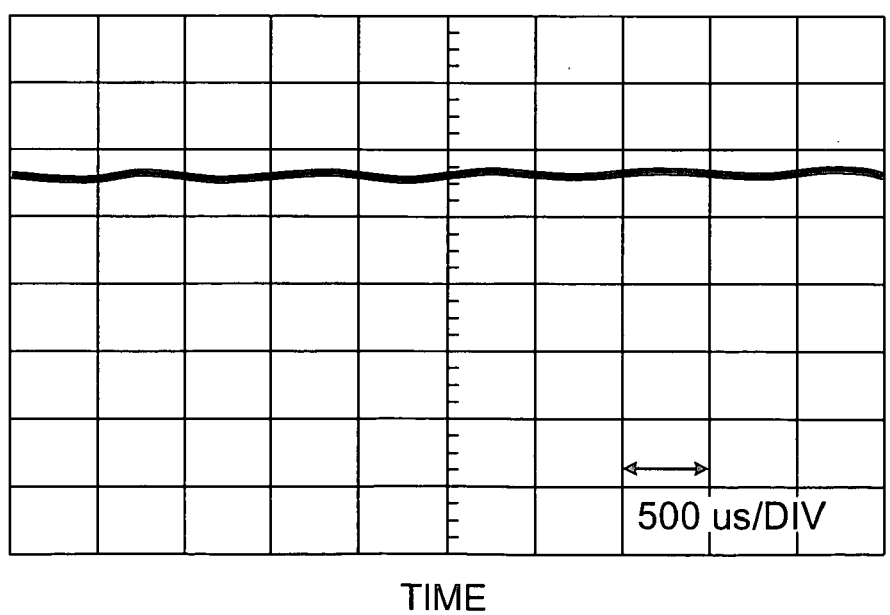
Figure 11A:
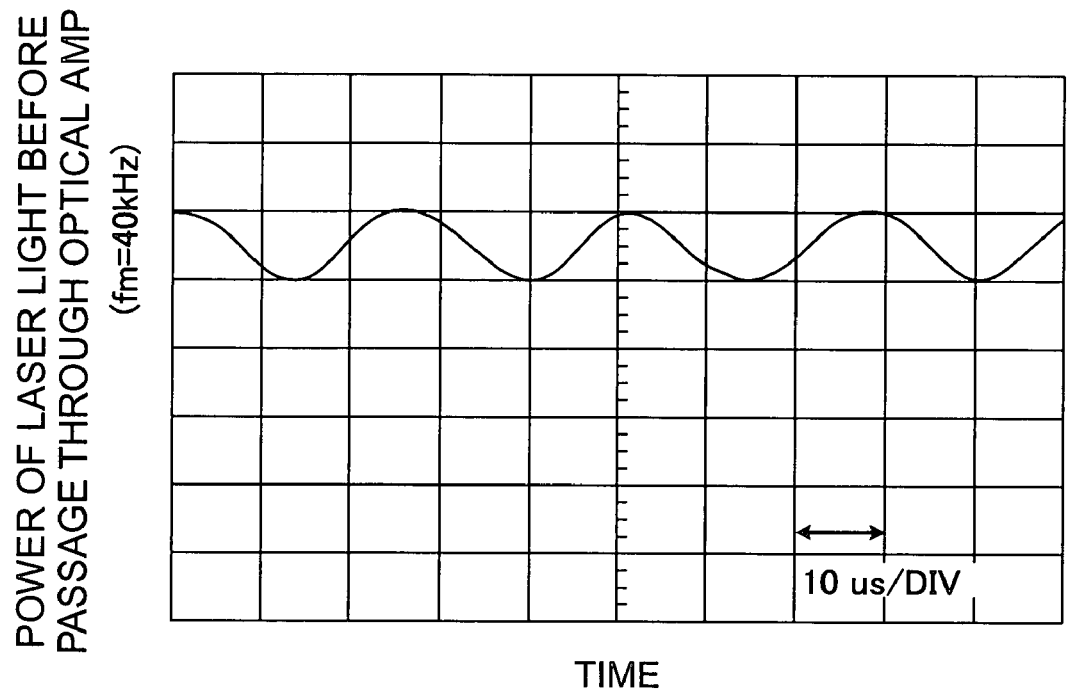
Figure 11B:
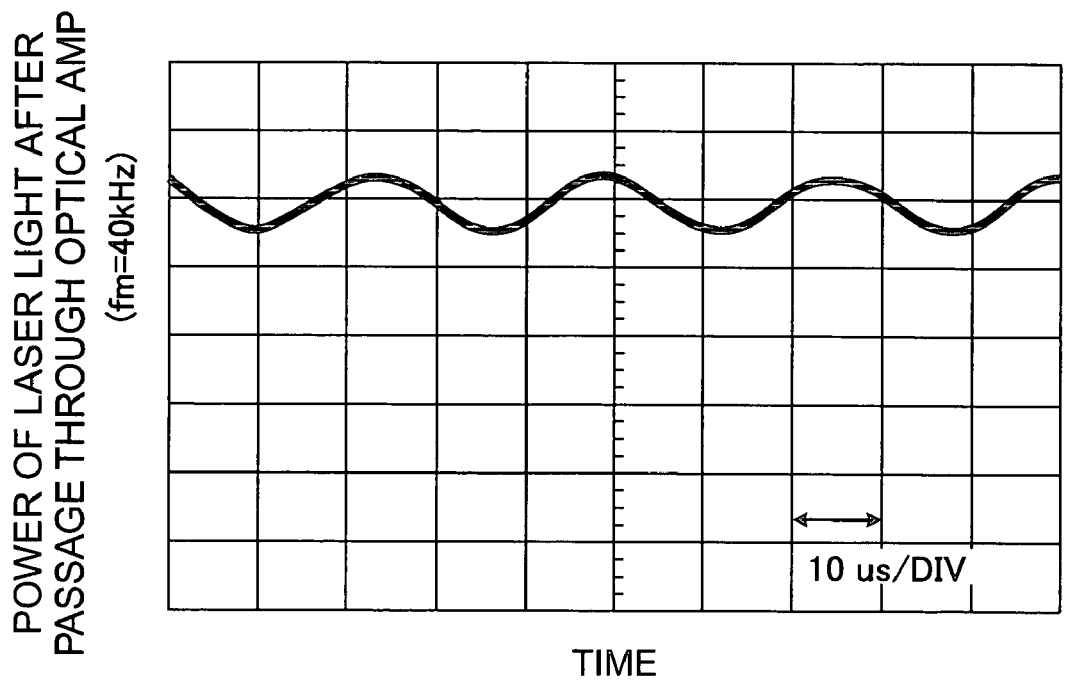

Further, FIG. 16A and FIG. 10B are diagrams to show the time waveforms of the laser light where the modulation frequency fm is 1 kHz and the modulation depth is 10%, wherein FIG. 10A is a diagram to show the time waveform of the laser light before input into the optical amplifier 13 (the waveform of the light including signals before amplification) and FIG. 10B a diagram to show the time waveform of the laser light after passage through the optical amplifier 13 (the waveform of the light including signals after amplification). FIG. 11A and FIG. 11B are diagrams to show the time waveforms of the laser light where the modulation frequency fm is 40 kHz and the modulation depth is 10%, wherein FIG. 11A is a diagram to show the time waveform of the laser light before input into the optical amplifier 13 (the waveform of the light including signals before amplification) and FIG. 11B a diagram to show the time waveform of the laser light after passage through the optical amplifier 13 (the waveform of the light including signals after amplification). As apparent from these figures, the modulation depth of the light including signals outputted from the optical amplifier 13 demonstrates a definite decrease where the modulation frequency fm is 1 kHz. In contrast with it, where the modulation frequency fm is 40 kHz, the modulation depth of the light including signals outputted from the optical amplifier 13 is almost equal to that of the light including signals inputted into the optical amplifier 13 (the light including signals before amplification).

Figure 12:
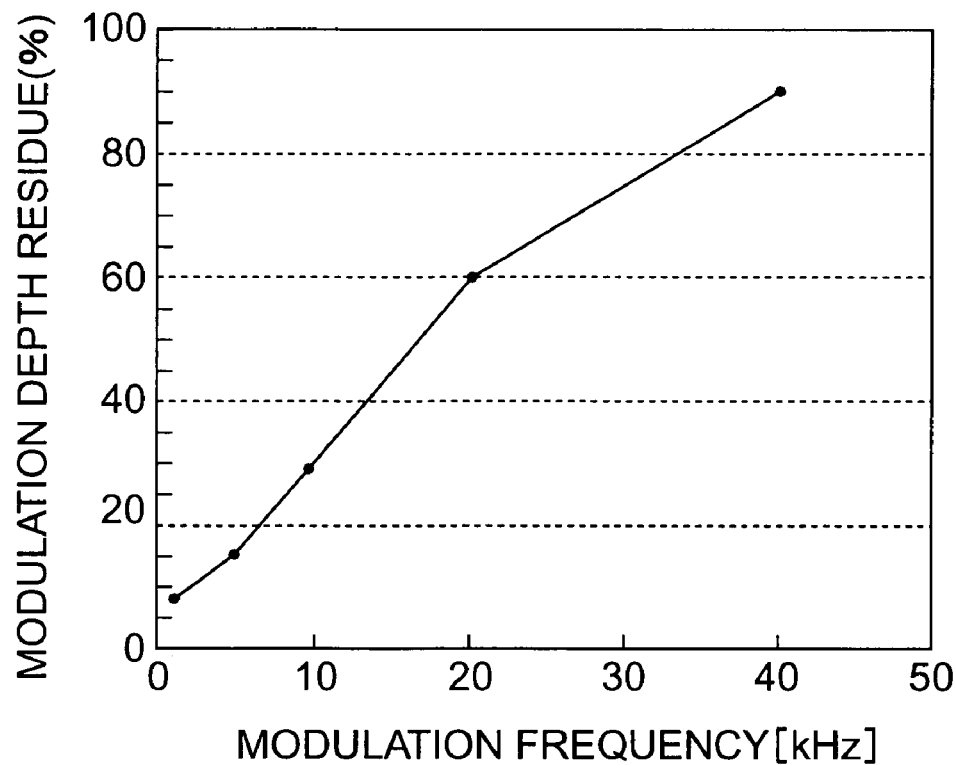
FIG. 12 is a graph to show an example of relationship between modulation frequency and modulation depth.

FIG. 12 is a graph to show an example of relationship between modulation frequency fm and modulation depth residue. The modulation depth residue herein is a ratio of the modulation depth of the light including signals amplitude-modulated at the frequency fm and outputted from the optical amplifier 13, to the modulation depth of the light including signals amplitude-modulated at the frequency fm and inputted into the optical amplifier 13. As seen from this graph, the smaller the modulation frequency fm, the smaller the modulation depth residue. Namely, the modulation depth residue is 60% or less in the range of the modulation frequency fm of 20 kHz or less, the modulation depth residue is 30% or less in the range of the modulation frequency fm of 10 kHz or less, and the modulation depth residue is 15% or less in the range of the modulation frequency fm of 5 kHz or less.

Figure 13:
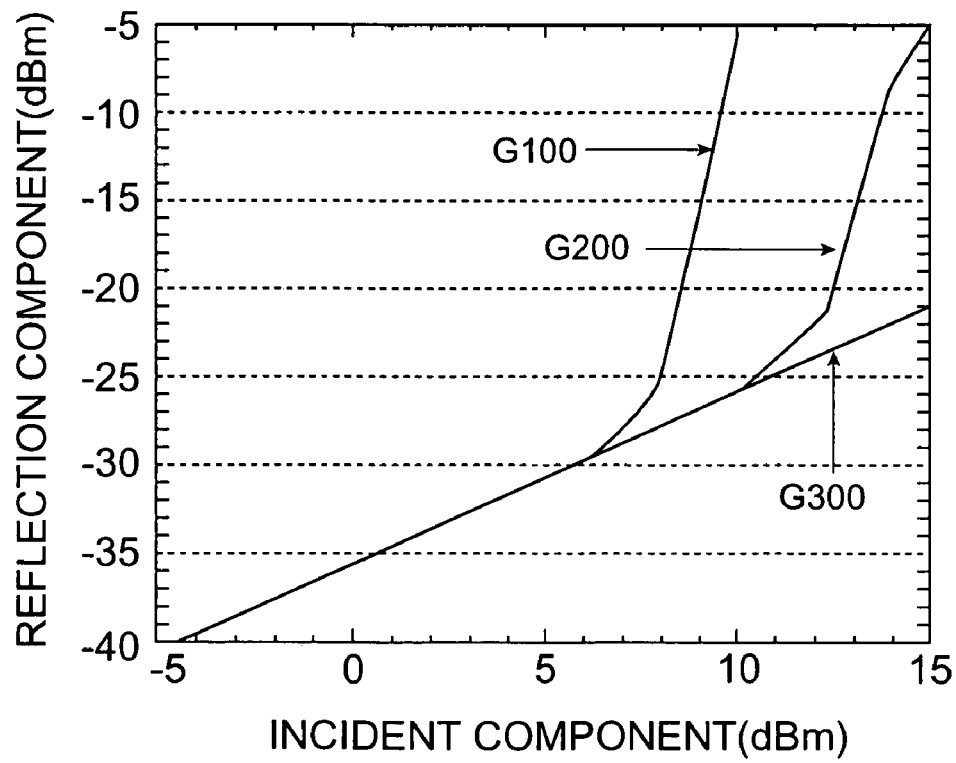
FIG. 13 is a graph to show the relationship between optical power (incident optical power) of the light including signals outputted from the optical amplifier to the optical transmission line and optical power (reflected optical power) of the reflected components from the optical transmission line.

FIG. 13 is a graph to show the relationship between optical power of the light including signals outputted from the optical amplifier 13 to the optical transmission line 20 (power of incident light) and optical power of the reflected components from the optical transmission line 20 (power of reflected light). Graphs G100, G200, and G300 represent results of measurement where the optical transmission line 20 was a 20 km-long single-mode optical fiber (without superposition of the high-frequency signal components). Particularly, graph G100 shows the results of measurement under the setting where the modulation frequency fm was 0 (no modulation), graph G200 the results of measurement under the setting where the modulation frequency fm was 1 kHz and the modulation depth was 10%, and graph G300 the results of measurement under the setting where the modulation frequency fm was 5 kHz and the modulation depth was 10%. As seen from these graphs, the SBS occurs less with increase in the modulation frequency fm.

As also apparent from the above description, in order to make the optical amplifier 13 output the light including signals from which the amplitude modulation components (the modulation components from the modulation signal source 11) except for the regular signal components are reduced, while effectively suppressing the occurrence of SBS, the modulation frequency fm of the laser light by the modulation signal source 11 is set preferably to be smaller than the reciprocal of the effective lifetime $\tau_{\it eff}$ of the higher energy state of the laser medium. The SBS suppression effect can be enhanced effectively by increasing the modulation frequency fm of the laser light by the modulation signal source 11. As described above, it was found that there was an appropriate band for the modulation frequency fm of the amplitude modulation of the laser light by the modulation signal source 11. The present invention has been accomplished based on the considerations and knowledge as described above, and such modulation depth control operation is carried out by the modulation depth control system 14.

Each embodiment of the optical communication system according to the present invention will be described below. The optical communication system of the first embodiment has the structure illustrated in FIG. 5A, as described previously, and the optical communication system according to the second embodiment has the structure illustrated in FIG. 5B, as described previously. In the both optical communication systems according to the respective embodiments, the optical transmission line 20 is a 200 km-long single-mode optical fiber or a 200 km-long dispersion-shifted optical fiber disposed between the optical transmitter 10a, 10b and the optical receiver 30. The optical power of the light including signals outputted from the optical transmitter 10a, 10b to the optical transmission line 20 is +15 dBm.

The inventor evaluated the power penalty of the light including signals at the optical receiver 30 for the optical communication systems of the above structures. As a result, it was verified that in the both optical fibers the power penalty was 1 dB or less and there occurred no degradation of transmission characteristics if the modulation frequency fm was 20 kHz or less. It was found that the power variation was independent of the degradation of waveform due to the nonlinear optical phenomena if the modulation depth of the light including signals was 10% or less at the output end of the optical amplifier 13. It was also confirmed that within the range of the modulation frequency fm to satisfy the relation of the modulation depth residue being 60% or less, increase of power penalty was able to be suppressed without causing a difference in the occurrence of nonlinear optical phenomena due to the difference of intensity caused by low-frequency modulation, even if the modulation depth was increased up to the level where the occurrence of SBS was able to be avoided.

As described above, the present invention provides the optical transmitter with the structure in which the laser light modulated by the modulation signals of the predetermined frequency (preferably, 20 kHz or less) undergoes such control that the ratio of the amplitude modulation depth of the laser light outputted from the optical amplifier to the amplitude modulation depth of the laser light outputted from the semiconductor laser source falls in the range of 60% or less, and the modulation depth of the outputted light from the optical amplifier is 10% or less, whereby the occurrence of the nonlinear optical phenomena, particularly, SBS can be effectively suppressed in the optical transmission line in which the laser light outputted from the optical amplifier (the amplified light including signals) propagates, thus enabling the output of high-power light signals.

Since the modulation depth of the light including signals outputted to the optical transmission line is controlled within the desired range in the optical communication system to which the optical transmitter having the structure as described above is applied, the occurrence of nonlinear optical phenomena, particularly, SBS can be suppressed effectively in the optical transmission line and the high-power light signals can be transmitted therethrough; therefore, the reception errors are reduced at the optical transmitter.

What is claimed is:

1. An optical transmitter comprising:
   a modulation signal source for outputting modulation signals of a predetermined frequency;
   a semiconductor laser source driven by said modulation signals outputted from said modulation signal source to output laser light modulated according to said modulation signals;
   an optical amplifier, including an erbium-doped optical fiber, for amplifying the laser light from said semiconductor laser source;
   a modulation depth control system for controlling a ratio of an amplitude modulation depth of amplified laser light outputted from the optical amplifier, to an amplitude modulation depth of the laser light inputted into said optical amplifier, is set in the range of 60% or less;
   a signal source for outputting signals to be transmitted, in the form of an electric signal; and
   an external modulator which is provided on a transmission line between said semiconductor laser source and said optical amplifier, which amplitude-modulates the laser light outputted from the semiconductor laser source, based on the electric signals outputted from said signal source, and which outputs the amplitude-modulated laser light as light including signals to said optical amplifier.

2. An optical transmitter according to claim 1, wherein said predetermined frequency is 20 kHz or less.

3. An optical communication system comprising:
   the optical transmitter as set forth in claim 1;
   an optical transmission line through which light signals outputted from said optical transmitter propagates; and
   an optical receiver for receiving said light signals having propagated through said optical transmission line.

4. An optical transmitter comprising:
   a modulation signal source for outputting modulation signals of a frequency not more than 20 kHz;
   a semiconductor laser source driven by said modulation signals outputted from said modulation signal source to output laser light modulated according to said modulation signals;
   an optical amplifier, including an erbium-doped optical fiber, for amplifying the laser light from said semiconductor laser source;

a modulation depth control system for controlling a modulation depth of said laser light is 10% or less at an output end of said optical amplifier;

a signal source for outputting signals to be transmitted, in the form of an electric signal; and an external modulator which is provided on a transmission line between said semiconductor laser source and said optical amplifier, which amplitude-modulates the laser light outputted from the semiconductor laser source, based on the electric signals outputted from\said signal source, and which outputs the amplitude--modulated laser light as light including signals to said optical amplifier.

5. An optical communication system comprising:

the optical transmitter as set forth in claim 4;

an optical transmission line through which light signals outputted from said optical transmitter propagates; and an optical receiver for receiving said light signals having propagated through said optical transmission line.

* * * * *